United States Patent
Tanaka et al.

(10) Patent No.: US 11,391,308 B2
(45) Date of Patent: Jul. 19, 2022

(54) WORK VEHICLE

(71) Applicant: Komatsu Ltd., Tokyo (JP)

(72) Inventors: Yushi Tanaka, Tokyo (JP); Ryosuke Maeda, Tokyo (JP); Masaaki Imaizumi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 981 days.

(21) Appl. No.: 16/080,809

(22) PCT Filed: Apr. 11, 2018

(86) PCT No.: PCT/JP2018/015295
§ 371 (c)(1),
(2) Date: Aug. 29, 2018

(87) PCT Pub. No.: WO2019/198183
PCT Pub. Date: Oct. 17, 2019

(65) Prior Publication Data
US 2021/0180623 A1 Jun. 17, 2021

(51) Int. Cl.
*E02F 9/22* (2006.01)
*F15B 21/08* (2006.01)
(Continued)

(52) U.S. Cl.
CPC ............ *F15B 21/087* (2013.01); *B60P 1/162* (2013.01); *B60Q 9/00* (2013.01); *E02F 9/2225* (2013.01);
(Continued)

(58) Field of Classification Search
CPC . B62D 5/07; B62D 5/075; E02F 9/225; F15B 11/162; F15B 21/087
See application file for complete search history.

(56) References Cited

U.S. PATENT DOCUMENTS 4,449,365 A * 5/1984 Hancock ................. B62D 5/07
180/417
5,255,517 A 10/1993 Weber
(Continued)

FOREIGN PATENT DOCUMENTS

AT 392447 B 3/1991
CN 107660257 A 2/2018
(Continued)

OTHER PUBLICATIONS

International Search Report dated May 22, 2018, issued for PCT/JP2018/015295.

*Primary Examiner* — Abiy Teka
(74) *Attorney, Agent, or Firm* — Locke Lord LLP

(57) ABSTRACT

A work vehicle includes: a hydraulic pump driven by an engine; a hydraulic actuator that is driven by hydraulic oil supplied from the hydraulic pump; a switching valve configured to switch from one to the other of a first state in which the hydraulic oil supplied from the hydraulic pump is supplied to a first channel and a second state in which the hydraulic oil supplied from the hydraulic pump is supplied to a second channel; a restriction operation device configured to generate an operation signal that restricts the drive of the hydraulic actuator; and a controller that controls the switching valve. The controller includes: an operation signal acquisition unit configured to acquire the operation signal; and an instruction output unit configured to output, to the switching valve, a control instruction that restricts the drive of the hydraulic actuator with the engine driving, in response to the operation signal.

11 Claims, 10 Drawing Sheets

(51) Int. Cl.
  *B60P 1/16* (2006.01)
  *B60Q 9/00* (2006.01)
  *F15B 11/17* (2006.01)
  *B60R 3/00* (2006.01)
  *B62D 33/06* (2006.01)
  *E02F 3/34* (2006.01)
  *E02F 9/08* (2006.01)
  *E02F 9/16* (2006.01)
  *E02F 9/20* (2006.01)

(52) U.S. Cl.
  CPC ............ *E02F 9/2267* (2013.01); *F15B 11/17* (2013.01); *B60K 2370/152* (2019.05); *B60K 2370/162* (2019.05); *B60R 3/00* (2013.01); *B62D 33/0617* (2013.01); *E02F 3/34* (2013.01); *E02F 9/0833* (2013.01); *E02F 9/16* (2013.01); *E02F 9/2004* (2013.01)

(56) References Cited

U.S. PATENT DOCUMENTS

| | | | |
|---|---|---|---|
| 5,454,762 A | 10/1995 | Sawase et al. | |
| 6,039,326 A | 3/2000 | Agner | |
| 6,822,347 B2 | 11/2004 | Roley | |
| 7,600,463 B2 * | 10/2009 | Kooriyama | B66F 9/22 |
| | | | 60/422 |
| 8,465,094 B2 | 6/2013 | Wada | |
| 8,756,930 B2 * | 6/2014 | Johnson | E02F 9/2242 |
| | | | 60/430 |
| 8,833,068 B2 | 9/2014 | Himoto et al. | |
| 11,047,112 B2 | 6/2021 | Jimbo et al. | |
| 2004/0050677 A1 | 3/2004 | Roley | |
| 2019/0032306 A1 | 1/2019 | Jimbo et al. | |

FOREIGN PATENT DOCUMENTS

| | | |
|---|---|---|
| EP | 0219293 A2 | 4/1987 |
| JP | 05-208621 A | 8/1993 |
| JP | 06-042506 U | 6/1994 |
| JP | 2544339 Y2 | 8/1997 |
| JP | 10-140618 A | 5/1998 |
| JP | 11-021079 A | 1/1999 |
| JP | 11-022226 A | 1/1999 |
| JP | 2000-072395 A | 3/2000 |
| JP | 2001-234559 A | 8/2001 |
| JP | 2002-106508 A | 4/2002 |
| JP | 2009-068164 A | 4/2009 |
| JP | 2011-106269 A | 6/2011 |
| JP | 2011-214622 A | 10/2011 |
| JP | 5467176 B1 | 4/2014 |
| JP | 2014-202244 A | 10/2014 |
| JP | 2016-194331 A | 11/2016 |
| WO | 98/02322 A1 | 1/1998 |
| WO | 2013/179517 A1 | 12/2013 |

* cited by examiner

WORK VEHICLE

FIELD

The present invention relates to work vehicles.

BACKGROUND

Work vehicles operate with an engine mounted thereon, as a power source. An operation device that starts and stops the engine (hereinafter, referred to as start/stop operation device) is provided on the work vehicle. An operator operates the start/stop operation device to start and stop the engine. Maintenance work for the work vehicles is generally performed with the engine stopped. On the other hand, there has been a demand for performing maintenance work with the engine driven. For example, in cold climate areas, it is highly likely that a temporal stop of the engine requires time to restart the engine and start work. For example, in the cold climate areas, the engine may be difficult to start, or a need of warming operation may arise when the engine starts. Therefore, there has been a demand for techniques enabling perform maintenance work with the engine driven.

In technical fields relating to the work vehicles, lockout systems have been proposed. Lockout means restricting the drive of a predetermined driving mechanism of a work vehicle with the engine of the work vehicle driven. A maintenance operator operates a restriction operation device, called a lockout switch provided on the work vehicle, to bring the work vehicle into a lockout state. The restriction on the drive of the driving mechanism with the engine driving allows the maintenance operator to smoothly perform maintenance work.

CITATION LIST

Patent Literature

Patent Literature 1: US 2004/0,050,677 A

SUMMARY

Technical Problem

When a driving mechanism is driven by hydraulic oil discharged from a hydraulic pump, in order to bring into a lockout state, a method of controlling the hydraulic pump to reduce the flow rate of the hydraulic oil discharged from the hydraulic pump or to inhibit discharging of the hydraulic oil from the hydraulic pump can be considered. For example, when the hydraulic pump is a swash-plate type hydraulic pump, a method of outputting a drive instruction to a driving element that drives a swash plate to reduce the flow rate of the hydraulic oil discharged from the hydraulic pump can be considered.

However, when an abnormality occurs in the hydraulic pump or the driving element that drives the swash plate, the hydraulic oil is likely to be supplied to the driving mechanism even though a lockout switch has been operated. As a result, the driving mechanism is likely to drive unintentionally during maintenance work.

An aspect of the present invention is to provide a work vehicle that can ensure the reliability of a lockout system.

Solution to Problem

According to an aspect of the present invention, a work vehicle, comprises: a hydraulic pump that is driven by an engine; a hydraulic actuator that is driven by hydraulic oil supplied from the hydraulic pump; a switching valve configured to switch from one to the other of a first state in which the hydraulic oil supplied from the hydraulic pump is supplied to a first channel and a second state in which the hydraulic oil supplied from the hydraulic pump is supplied to a second channel; a restriction operation device configured to generate an operation signal that restricts a drive of the hydraulic actuator; and a controller configured to control the switching valve, wherein the controller includes: an operation signal acquisition unit configured to acquire the operation signal; and an instruction output unit configured to output, to the switching valve, a control instruction that restricts the drive of the hydraulic actuator with the engine driving, in response to the operation signal.

Advantageous Effects of Invention

According to an aspect of the present invention, a work vehicle that can ensure the reliability of a lockout system is provided.

DESCRIPTION OF EMBODIMENTS

Embodiments according to the present invention will be described below with reference to the drawings; however, the invention is not limited to the embodiments. Constituent elements in the embodiments described below can be appropriately combined. Additionally, some of the constituent elements may not be included.

In descriptions below, the positional relationship between respective elements will be described, using terms of a longitudinal direction, a lateral direction, and a front-back direction. The longitudinal direction means a direction orthogonal to the grounding surface of a wheel of a work vehicle that is in contact with the ground. The lateral direction means a direction parallel to a rotary shaft of a wheel that is not steered, of a plurality of wheels of the work vehicle. The lateral direction is a synonym to a vehicle width direction of the work vehicle. The front-back direction means a direction orthogonal to the lateral direction and the longitudinal direction.

An upside means one direction in the longitudinal direction and indicates a direction away from the grounding surface of the wheel. A downside means a direction opposite to the upside in the longitudinal direction and indicates a direction close to the grounding surface of the wheel. A left side means one direction in the lateral direction and indicates a left side direction, when a seat on which a work vehicle's operator sits and a steering wheel that is to be operated by the operator are provided, with respect to the work vehicle's operator sitting on the seat. A right side means a direction opposite to the left side in the lateral direction and indicates a right side direction, with respect to the work vehicle's operator sitting on the seat. A front side means one direction in the front-back direction and indicates a direction from the seat to the steering wheel. A back side means a direction opposite to the front side in the front-back direction and indicates a direction from the steering wheel to the seat.

Furthermore, an upper portion means an upper side portion of a member or a space in the longitudinal direction, and indicates a portion away from the grounding surface of the wheel. A lower portion means a lower side portion of the member or the space in the longitudinal direction and indicates a portion near the grounding surface of the wheel. A left portion means a left side portion of the member and the space, with respect to the work vehicle's operator sitting on the seat. A right portion means a right side portion of the member and the space, with respect to the work vehicle's operator sitting on the seat. A front portion means a front side portion of the member or the space in the front-back direction. A rear portion means a rear side portion of the member or the space in the front-back direction.

First Embodiment

[Work Vehicle]

Figure 1:
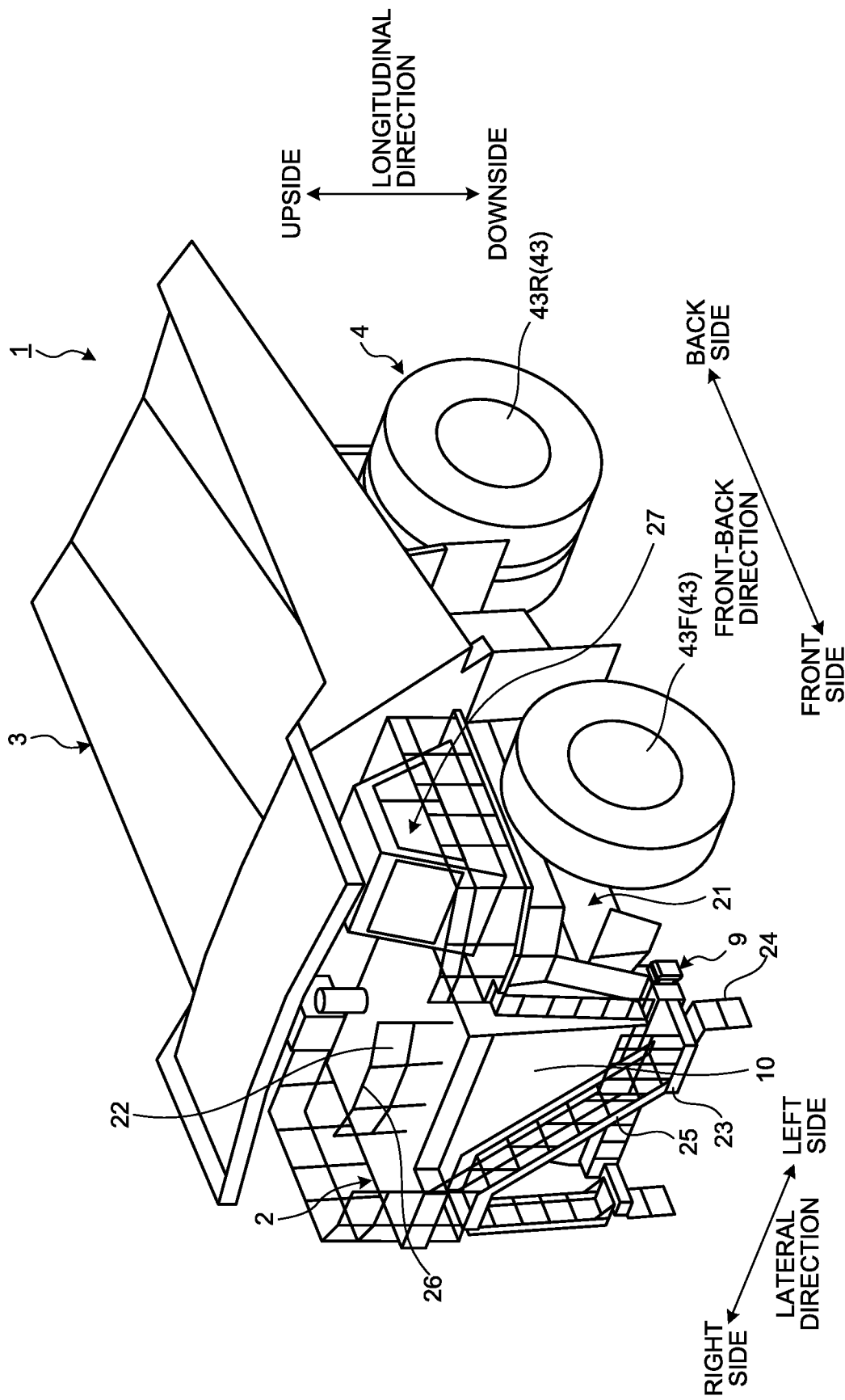
FIG. 1 is a perspective view illustrating one example of a work vehicle according to a first embodiment.
Figure 2:
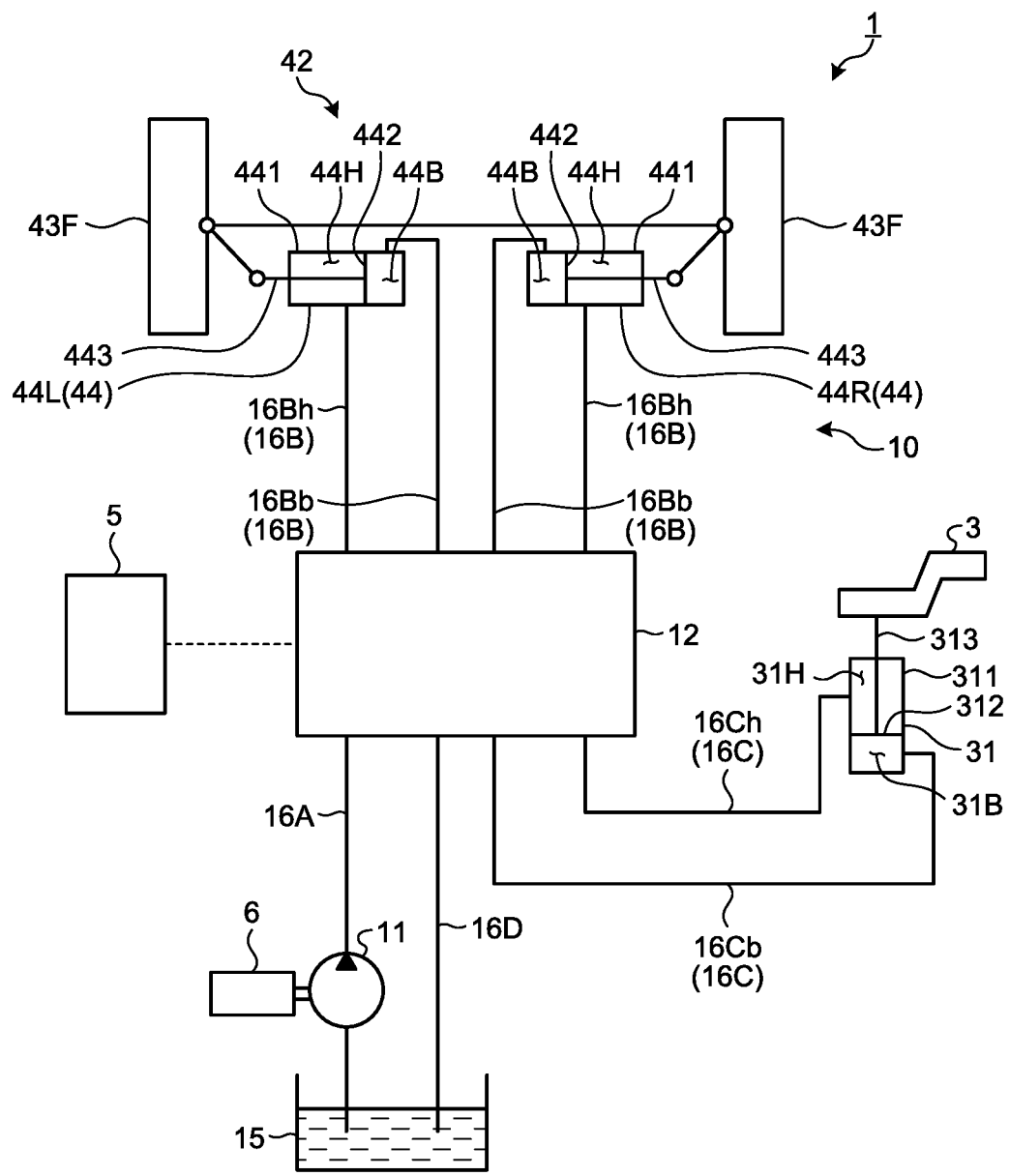
FIG. 2 is a view schematically illustrating one example of a hydraulic system of the work vehicle according to the first embodiment.

FIG. 1 is a perspective view illustrating one example of a work vehicle 1 according to a first embodiment. FIG. 2 is a view schematically illustrating one example of a hydraulic system 10 of the work vehicle 1 according to the present embodiment. In the present embodiment, an example in which the work vehicle 1 is a dump truck 1 will be described. The dump truck 1 is a self-propelled off-road dump truck that operates at a mining site of a mine. The dump truck 1 is a rigid-frame type. Note that the dump truck 1 may be an articulate type.

As illustrated in FIGS. 1 and 2, the dump truck 1 includes: a vehicle main body 2; a dump body 3 supported by the vehicle main body 2 and configured to load a load; a travel device 4 capable of moving while supporting the vehicle main body 2; and a controller 5.

The vehicle main body 2 includes: a frame 21; a floor deck 22 provided on an upper portion of the frame 21; and a lower deck 23 provided on a lower portion of the frame 21. The frame 21 is supported by the travel device 4.

A tiltable step 24 is provided on the lower deck 23. A diagonal ladder 25 is provided between the lower deck 23 and the floor deck 22. A lower end of the diagonal ladder 25 is coupled to a left portion of the lower deck 23 and an upper end of the diagonal ladder 25 is coupled to a right portion of the floor deck 22. A handrail 26 is provided on the front side of the floor deck 22.

The vehicle main body 2 includes an operation cab 27. The operation cab 27 is disposed on at least part of the floor deck 22. In the present embodiment, the operation cab 27 is provided on a left portion of the floor deck 22. At least part of the floor deck 22 is disposed on the front side of the operation cab 27. Additionally, at least part of the floor deck 22 is disposed on the right side of the operation cab 27.

An operator boards the operation cab 27. A seat on which the operator sits is provided in the operation cab 27. Additionally, a plurality of work operation devices disposed in the operation cab 27 is operated by the operator. The work operation devices disposed in the operation cab 27 includes at least a steering wheel. As described above, the front side means the direction from the seat to the steering wheel. The operator operates the steering wheel to adjust a travel direction of the dump truck 1.

When boarding the operation cab 27, the operator ascends the tiltable step 24 on a left portion of the vehicle main body 2 and then moves to the lower deck 23. Thereafter, the operator ascends the diagonal ladder 25 to move to the right portion of the floor deck 22. The operator having reached the right portion of the floor deck 22 walks toward the left portion of the floor deck 22. The operator having reached the left portion of the floor deck 22 moves to a left portion of the operation cab 27 and then opens a door provided on the left portion of the operation cab 27 to board the operation cab 27. The tiltable step 24, the lower deck 23, the diagonal ladder 25, and the floor deck 22 are an ascent/descent passage leading to the operation cab 27. The operator or a maintenance operator can board the operation cab 27 or get off the vehicle main body 2 by passing though the ascent/descent passage.

The dump body 3 loads a load. The dump body 3 moves with power generated by a work-machine cylinder 31. The dump body 3 can stand or sit with the work-machine cylinder 31.

The work-machine cylinder 31 is disposed between the vehicle main body 2 and the dump body 3 to allow the dump body 3 to stand or sit. The dump body 3 is adjusted in at least one posture of a loading posture or a standing posture by an operation of the work-machine cylinder 31. The loading posture means, in a movable range of the dump body 3, a posture in which the dump body 3 descends the most and then sits closest to the vehicle main body 2. The standing posture means, in the movable range of the dump body 3, a posture in which the dump body 3 stands the most and farthest from the vehicle main body 2. When the dump body 3 is in the loading posture, the load is loaded on the dump body 3 and the dump truck 1 can travel. When the dump body 3 is in the standing posture, the load is discharged from the dump body 3.

In the present embodiment, the dump truck 1 is a rear-dump type and discharges the load from the dump body 3 by tilting the dump body 3 rearward. Note that, the dump truck 1 may be a side-dump type that discharges the load from the dump body 3 by tilting the dump body 3 leftward or rightward.

The travel device 4 includes a steering device 42 that adjusts the travel direction, and a wheel 43. The wheel 43 rotates, so that the dump truck 1 travels. The wheel 43 includes a front wheel 43F and a rear wheel 43R. A tire is mounted on the wheel 43.

The rear wheel 43R is disposed on the back side of the front wheel 43F. Each front wheel 43F is disposed on the left side and the right side of the vehicle main body 2. Each rear wheel 43R is disposed on the left side and the right side of the vehicle main body 2. Note that the left and right rear wheels 43R each include two tires.

The travel device 4 operates with power generated by an engine 6. The engine 6 generates a drive force for accelerating the dump truck 1. The engine 6 includes an internal combustion engine like a diesel engine. Note that, instead of the engine 6 or in addition to the engine 6, an electric motor may be provided as a driving device that drives the travel device 4. The power generated by the engine 6 is transmitted to the rear wheel 43R. The rear wheel 43R rotates, so that the travel device 4 travels.

The steering device 42 is capable of adjusting the travel direction of the dump truck 1. The travel direction of the dump truck 1 includes a direction of a front portion of vehicle main body 2. The steering device 42 operates with power generated by a steering cylinder 44. The steering cylinder 44 is a hydraulic cylinder.

The steering device 42 steers the front wheel 43F to adjust the travel direction of the dump truck 1. The front wheel 43F is steered by operating the steering wheel by the operator. In the present embodiment, the rear wheel 43R is not steered by operating the steering wheel. As describe above, the lateral direction means the direction parallel to the rotary shaft of the wheel that is not steered, of the plurality of wheels of the work vehicle 1. In the present embodiment, the lateral direction means a direction parallel to the rotary shaft of the rear wheel 43R.

A hydraulic system 10 includes: a hydraulic pump 11 that is driven by the engine 6; a valve device 12 coupled to the hydraulic pump 11 via a channel 16A and a channel 16D; the steering cylinder 44 that is driven by the hydraulic oil supplied from the hydraulic pump 11; the work-machine cylinder 31 that is driven by the hydraulic oil supplied from the hydraulic pump 11; and a hydraulic oil tank 15 that stores the hydraulic oil.

The engine 6 is a power source for the hydraulic pump 11. The hydraulic pump 11 is a power source for the steering cylinder 44 and the work-machine cylinder 31. The hydraulic pump 11 is coupled to an output shaft of the engine 6 and operates with the drive force generated by the engine 6. The hydraulic pump 11 sucks the hydraulic oil stored in the hydraulic oil tank 15 and then discharges the hydraulic oil from the outlet port.

The steering cylinder 44 operates the steering device 42. The steering device 42 operates with the power generated by the steering cylinder 44. The steering cylinder 44 is the hydraulic cylinder (hydraulic actuator) that is driven by the hydraulic oil supplied from the hydraulic pump 11. The steering cylinder 44 expands and contracts in accordance with the flow rate of the hydraulic oil. The steering cylinder 44 expands and contracts, so that the steering device 42 coupled to the steering cylinder 44 operates.

The hydraulic oil discharged from the hydraulic pump 11 is supplied to the steering cylinder 44 via the channel 16A, the valve device 12, and a channel 16B. The hydraulic oil flowing out from the steering cylinder 44 is returned to the hydraulic oil tank 15 via the channel 16B, the valve device 12, and the channel 16D.

The steering cylinder 44 includes: a cylinder tube 441 having a bottom; a piston 442 that divides the interior space of the cylinder tube 441 into a bottom chamber 44B and a head chamber 44H; and a rod 443 coupled to the piston 442. A channel 16Bb is connected to the bottom chamber 44B. A channel 16Bh is connected to the head chamber 44H.

The hydraulic oil discharged from the hydraulic pump 11 is supplied to the bottom chamber 44B via the channel 16A, the valve device 12, and the channel 16Bb. When the hydraulic oil is supplied to the bottom chamber 44B, the steering cylinder 44 expands.

Furthermore, the hydraulic oil discharged from the hydraulic pump 11 is supplied to the head chamber 44H via the channel 16A, the valve device 12, and the channel 16Bh. When the hydraulic oil is supplied to the head chamber 44H, the steering cylinder 44 contracts.

The left-side front wheel 43F and the right-side front wheel 43F are coupled via a link mechanism. In the present embodiment, the steering cylinder 44 includes a steering cylinder 44L and a steering cylinder 44R. In response to an operation of the steering cylinder 44L and the steering cylinder 44R, the left-side front wheel 43F and the right-side front wheel 43F coupled via the link mechanism operate in synchronization with each other. Note that the steering cylinder 44 may be single.

The work-machine cylinder 31 operates the dump body 3. The dump body 3 operates with the power generated by the work-machine cylinder 31. The work-machine cylinder 31 is a hydraulic cylinder (hydraulic actuator) that is driven by the hydraulic oil supplied from the hydraulic pump 11.

The work-machine cylinder 31 includes: a cylinder tube 311 having a bottom; a piston 312 that divides the interior space of the cylinder tube 311 into a bottom chamber 31B and a head chamber 31H; and a rod 313 coupled to a piston 312. A channel 16Cb is connected to the bottom chamber 31B. A channel 16Ch is connected to the head chamber 31H.

The hydraulic oil discharged from the hydraulic pump 11 is supplied to the bottom chamber 31B through the channel 16A, the valve device 12, and the channel 16Cb. When the hydraulic oil is supplied to the bottom chamber 31B, the work-machine cylinder 31 expands.

Furthermore, the hydraulic oil discharged from the hydraulic pump 11 is supplied to the head chamber 31H via the channel 16A, the valve device 12, and the channel 16Ch. When the hydraulic oil is supplied to the head chamber 31H, the work-machine cylinder 31 contracts.

The work-machine cylinder 31 expands and contracts, so that the dump body 3 coupled to the work-machine cylinder 31 stands or sits.

The hydraulic oil flowing out from the work-machine cylinder 31 is returned to the hydraulic oil tank 15 via the channel 16C, the valve device 12, and the channel 16D.

The valve device 12 operates in response to a control instruction from the controller 5. The valve device 12 is capable of adjusting the flowing state of the hydraulic oil in the channel 16B connected to the steering cylinder 44 and the flowing state of the hydraulic oil in the channel 16C connected to the work-machine cylinder 31.

The valve device 12 includes: a steering valve 121 that is a first flow-rate adjusting valve capable of adjusting the flow rate and the direction of the hydraulic oil that is to be supplied to the steering cylinder 44; and a work-machine valve 122 that is a second flow-rate adjusting valve capable of adjusting the flow rate and the direction of the hydraulic oil that is to be supplied to the work-machine cylinder 31.

[Lockout System]

Figure 3:
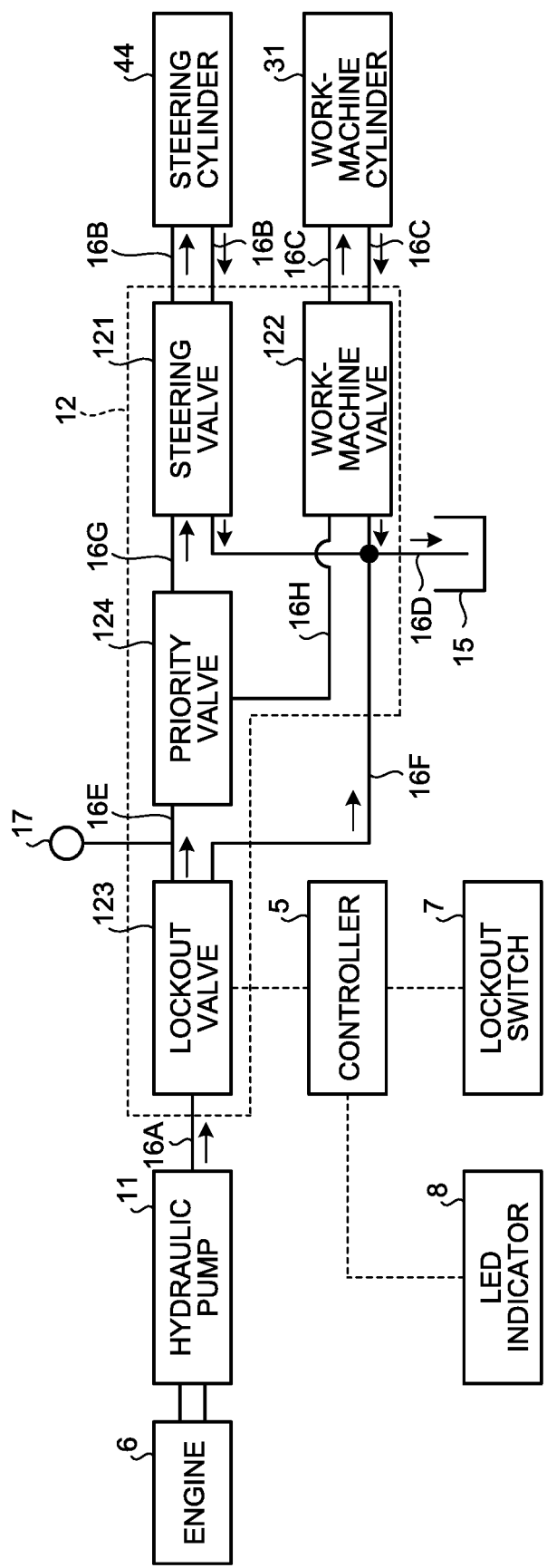
FIG. 3 is a block diagram schematically illustrating one example of a lockout system according to the first embodiment.

FIG. 3 is a block diagram illustrating one example of a lockout system according to the present embodiment. The lockout system includes the valve device 12, a lockout switch 7, and the controller 5.

The valve device 12 includes: the steering valve 121 capable of adjusting the flow rate and the direction of the hydraulic oil that is to be supplied to the steering cylinder 44; the work-machine valve 122 capable of adjusting the flow rate and the direction of the hydraulic oil that is to be supplied to the work-machine cylinder 31; a lockout valve 123 for bringing the hydraulic system 10 into the lockout state; and a priority valve 124 for distributing the hydraulic oil into the steering valve 121 and the work-machine valve 122.

The lockout valve 123 switches a flow path of the hydraulic oil supplied from the hydraulic pump 11. The lockout valve 123 is capable of bringing any one state of the non-lockout state (first state) in which the hydraulic oil supplied from the hydraulic pump 11 is supplied to a channel 16E (first channel) connected to the priority valve 124, or the lockout state (second state) in which the hydraulic oil supplied from the hydraulic pump 11 is supplied to a channel 16F (second channel) connected to the hydraulic oil tank 15. The non-lockout state includes a state in which the flow path of the hydraulic oil supplied from the hydraulic pump 11 is the channel 16E. The lockout state includes a state in which the flow path of the hydraulic oil supplied from the hydraulic pump 11 is the channel 16F. The lockout valve 123 is a switching valve that is capable of switching the flow path of the hydraulic oil from one to the other between the channel 16E and the channel 16F.

The channel 16A makes a connection between the hydraulic pump 11 and the lockout valve 123. The lockout valve 123 is coupled to the hydraulic pump 11 via the channel 16A.

The channel 16E makes a connection between the lockout valve 123 and at least one of the steering cylinder 44 and the work-machine cylinder 31. The lockout valve 123 is coupled to the priority valve 124 via the channel 16E. The priority valve 124 is coupled to the steering cylinder 44 via a channel 16G, the steering valve 121, and the channel 16B. The priority valve 124 is coupled to the work-machine cylinder 31 via a channel 16H, the work-machine valve 122, and the channel 16C.

The channel 16F makes a connection between the lockout valve 123 and the hydraulic oil tank 15. The lockout valve 123 is coupled to the hydraulic oil tank 15 via the channel 16F.

The non-lockout state is a state in which the hydraulic oil discharged from the hydraulic pump 11 is supplied to at least one of the steering cylinder 44 and the work-machine cylinder 31. The lockout state is a state in which the hydraulic oil discharged from the hydraulic pump 11 is supplied to the hydraulic oil tank 15 without being supplied to the steering cylinder 44 and the work-machine cylinder 31.

The controller 5 controls the lockout valve 123. The lockout valve 123 includes a solenoid valve and drives in response to the control instruction output from the controller 5.

When bringing into the non-lockout state (when a lockout function is turned off), the controller 5 controls the lockout valve 123 such that the hydraulic oil discharged from the hydraulic pump 11 is supplied to the priority valve 124 via the channel 16E and the hydraulic oil discharged from the hydraulic pump 11 is not supplied to the hydraulic oil tank 15 via the channel 16F. As a result, the hydraulic oil is supplied to at least one of the steering cylinder 44 and the work-machine cylinder 31, and at least one of the steering cylinder 44 and the work-machine cylinder 31 drives.

When bringing into the lockout state (when the lockout function is turned on), the controller 5 controls the lockout valve 123 such that the hydraulic oil discharged from the hydraulic pump 11 is not supplied to the priority valve 124 via the channel 16E and the hydraulic oil discharged from the hydraulic pump 11 is supplied to the hydraulic oil tank 15 via the channel 16F. As a result, no hydraulic oil is supplied to the steering cylinder 44 and the work-machine cylinder 31. In the lockout state, the steering cylinder 44 and the work-machine cylinder 31 do not drive.

The priority valve 124 distributes the hydraulic oil supplied from the hydraulic pump 11 via the lockout valve 123, into the steering valve 121 and the work-machine valve 122. The priority valve 124 is coupled to the steering valve 121 via the channel 16G. The priority valve 124 is coupled to the work-machine valve 122 via the channel 16H.

The controller 5 is coupled to the lockout switch 7 mounted on the dump truck 1. The lockout switch 7 is a restriction operation device capable of generating an operation signal that restricts the drive of the steering cylinder 44 and the work-machine cylinder 31.

The controller 5 controls the lockout valve 123 in response to the operation signal generated by the operation of the lockout switch 7. The operation signal that can be generated by the lockout switch 7 includes: an ON signal that brings into the lockout state; and an OFF signal that releases the lockout state to bring into the non-lockout state.

The controller 5 receives the ON signal from the lockout switch 7 and then outputs the control instruction for bringing into the lockout state, to the lockout valve 123. The lockout valve 123, in response to the control instruction, operates such that the hydraulic oil discharged from the hydraulic pump 11 is not supplied to the priority valve 124 via the channel 16E and the hydraulic oil discharged from the hydraulic pump 11 is supplied to the hydraulic oil tank 15 via the channel 16F.

The controller 5 receives the OFF signal from the lockout switch 7 and then outputs the control instruction for bringing into the non-lockout state, to the lockout valve 123. The lockout valve 123, in response to the control instruction, operates such that the hydraulic oil discharged from the hydraulic pump 11 is supplied to the priority valve 124 via the channel 16E and the hydraulic oil discharged from the hydraulic pump 11 is not supplied to the hydraulic oil tank 15 via the channel 16F.

A pressure sensor 17 detects the pressure of the hydraulic oil that flows though the channel 16E between the lockout valve 123 and the priority valve 124. A detection signal of the pressure sensor 17 is output to the controller 5.

The pressure sensor 17 is provided so as to determine whether the lockout state is made. In the lockout state, no hydraulic oil flows into the channel 16E, and thus the pressure in the channel 16E becomes a pressure threshold value or less. In the non-lockout state, the hydraulic oil flows into the channel 16E, and thus the pressure in the channel 16E becomes greater than the pressure threshold value. Even though the controller 5 has output the control instruction for bringing into the lockout state, to the lockout valve 123, when the pressure detected by the pressure sensor 17 is greater than the pressure threshold value, the controller 5 determines that no lockout state is made, and can output an abnormal signal.

Note that, the pressure sensor 17 may detect pressure in the channel 16F between the lockout valve 123 and the hydraulic oil tank 15. In the lockout state, the hydraulic oil flows into the channel 16F, and thus the pressure in the channel 16F becomes greater than the pressure threshold value. In the non-lockout state, no hydraulic oil flows into the channel 16F, and thus the pressure in the channel 16F becomes the pressure threshold value or less. Even though the controller 5 has output the control instruction for bringing into the lockout state, to the lockout valve 123, when the pressure detected by the pressure sensor 17 is the pressure threshold value or less, the controller 5 determines that no lockout state is made, and can output an abnormal signal.

[Controller]

Figure 4:
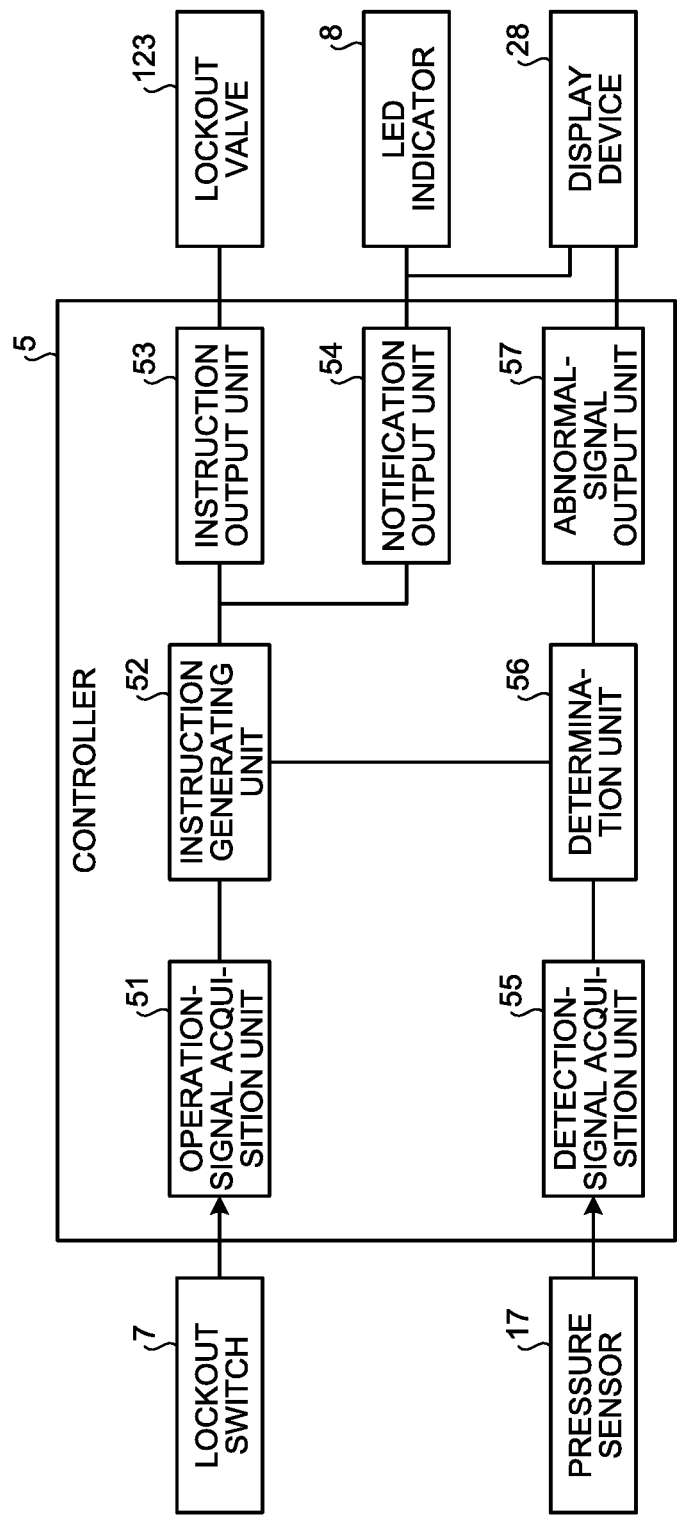
FIG. 4 is a functional block diagram illustrating one example of a controller according to the first embodiment.

FIG. 4 is a functional block diagram illustrating one example of the controller 5 according to the present embodiment. As illustrated in FIG. 4, the controller 5 includes: an operation signal acquisition unit 51; an instruction generating unit 52; an instruction output unit 53; a notification output unit 54; a detection signal acquisition unit 55; a determination unit 56; and an abnormal signal output unit 57.

The operation signal acquisition unit 51 acquires, from the lockout switch 7, the operation signal generated by the operation of the lockout switch 7.

The instruction generating unit 52, in response to the operation signal acquired by the operation signal acquisition unit 51, generates a control instruction for restricting the drive of the steering cylinder 44 and the work-machine cylinder 31 with the engine 6 driving.

The instruction output unit 53 outputs the control instruction generated by the instruction generating unit 52, to the lockout valve 123.

The notification output unit 54, in response to the control instruction generated by the instruction generating unit 52, generates a notification signal for indicating that the drive of the steering cylinder 44 and the work-machine cylinder 31 is being restricted. In the present embodiment, the notification output unit 54 outputs the notification signal to a light-emitting diode (LED) indicator 8 that is a notification device provided next to the lockout switch 7. The LED indicator 8 lights up in response to the notification signal. This allows the operator or the maintenance operator to recognize that the lockout state is made, by looking at the LED indicator 8.

The detection signal acquisition unit 55 acquires a detection signal of the pressure in the channel 16E, from the pressure sensor 17. Note that, as described above, the pressure sensor 17 may be provided in the channel 16F. The detection signal acquisition unit 55 may acquire a detection signal of the pressure in the channel 16F, from the pressure sensor 17.

The determination unit 56 determines whether the lockout valve 123 is abnormal in response to the detection signal acquired by the detection signal acquisition unit 55 and the control instruction generated by the instruction generating unit 52. As described above, in the lockout state, the pressure in the channel 16E becomes the pressure threshold value or less, and when the lockout state is released, the pressure in the channel 16E becomes greater than the pressure threshold value. Even though the control instruction for bringing into the lockout state has been generated in the instruction generating unit 52, when the detection value of the pressure in the channel 16E acquired by the detection signal acquisition unit 55 is greater than the pressure threshold value, the determination unit 56 determines that no lockout state is made and the lockout valve 123 is abnormal.

The abnormal signal output unit 57 outputs an abnormal signal when the determination unit 56 determines that the lockout valve 123 is abnormal. In the present embodiment, the abnormal signal output unit 57 outputs the abnormal signal to a display device 28 provided in the operation cab 27. The display device 28 displays a display data indicating that the lockout valve 123 is abnormal. As a result, the operator in the operation cab 27 can recognize that the lockout valve 123 is abnormal, by looking at the display device 28. Note that, the abnormal signal output unit 57 may output the abnormal signal to the LED indicator 8. The LED indicator 8 may operate in a predetermined illuminating state indicating that the lockout valve 123 is abnormal. For example, the LED indicator 8 blinks, so that the maintenance operator can recognize that the lockout valve 123 is abnormal, by looking at the LED indicator 8.

[Lockout Switch]

The lockout switch 7 is disposed in a box 9. As illustrated in FIG. 1, the box 9 is fixed on a lower left portion of the front portion of the vehicle main body 2. The box 9 is disposed in the vicinity of the ascent/descent passage leading to the operation cab 27. The vicinity of the ascent/descent passage means a potion in the range of a predetermined distance from the ascent/descent passage. The predetermined distance is, for example, 2 [m]. Note that at least part of the box 9 may be disposed on the ascent/descent passage.

The lockout switch 7 is disposed at a position where the operator boarding the operation cab 27 is difficult to operate while staying in the operation cab 27. The lockout switch 7 is disposed at a position where the maintenance operator who operates maintenance work outside the dump truck 1 can operate. The lockout switch 7 is disposed, for example, at a position where the maintenance operator reaches with standing on the ground.

The lockout switch 7 switches from one to the other between the lockout state and the non-lockout state. The lockout switch 7 may be a toggle switch or a locker switch.

Figure 5:
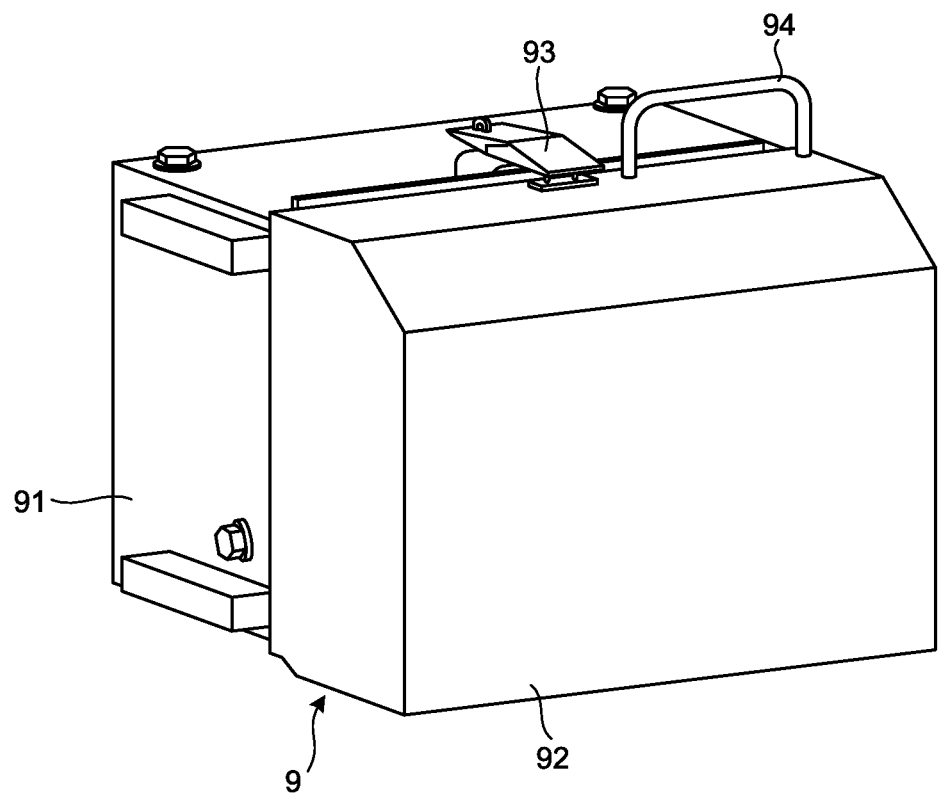
FIG. 5 is a view for explaining a lockout switch according to the first embodiment.
Figure 6:
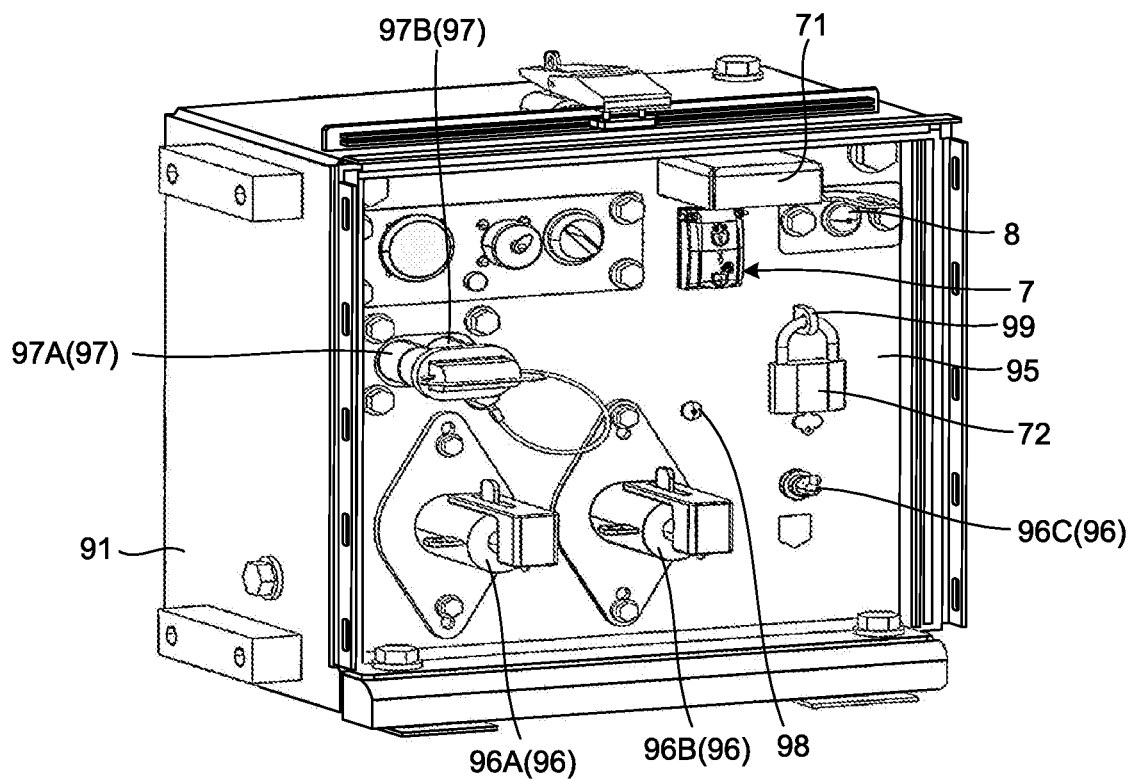
FIG. 6 is a view for explaining the lockout switch according to the first embodiment.

FIGS. 5 and 6 are views for explaining the lockout switch 7 according to the present embodiment. As illustrated in FIGS. 5 and 6, the box 9 includes: a main body member 91 fixed to the vehicle main body 2; a lid member 92 coupled to the main body member 91 so as to cover at least part of the main body member 91; a lock mechanism 93 that fixes the main body member 91 and the lid 92; and a handle member 94 provided on the lid member 92.

FIG. 6 illustrates the lid 92 illustrated in FIG. 5 open. As illustrated in FIG. 6, the lockout switch 7, the LED indicator 8, a plurality of maintenance operation devices 96 for maintenance work, and a plurality of connectors 97 are provided on the main body member 91. The main body member 91 includes the lockout switch 7, the LED indicator 8, the maintenance operation devices 96, and a support plate 95 on which the connectors 97 are disposed. The lid 92 is coupled to the main body member 91 so as to cover the support plate 95.

Examples of the maintenance operation devices 96 provided on the main body member 91 include: a starter disconnector switch 96A; a battery disconnector switch 96B; and an engine-room lamp illuminating switch 96C. The starter disconnector switch 96A and the battery disconnector switch 96B are the maintenance operation devices (start/stop operation devices) that allow the engine 6 to stop and that shut off power from a battery. Examples of the connectors 97 provided on the main body member 91 include a jump-start connector 97A and a data connector 97B that is to be connected to a cable for downloading data accumulated in the dump truck 1. Furthermore, a system operation lamp 98 is provided on the main body member 91.

When the lockout switch 7 is operated, the LED indicator 8 lights up. The LED indicator 8 is provided next to the lockout switch 7. This allows the operator or the maintenance operator to recognize whether the lockout state is made, by looking at the LED indicator 8.

The box 9 includes a cover member 71 that covers the lockout switch 7. A hinge mechanism is provided on an upper portion of the cover member 71. The cover member 71 is turnably supported by the support plate 95 via the hinge mechanism. FIG. 6 illustrates the cover member 71 turned upward and the lockout switch 7 appearing.

The cover member 71 is fixed with a padlock 72. With the cover member 71 turned downward and coupled to a cover coupling portion 99 that is protruded from the support plate 95, the padlock 72 fixes the cover member 71 and the cover coupling portion 99. A bar of the padlock 72 is inserted into a hole provided through the cover coupling portion 99. When the padlock 72 is locked, the cover member 71 is not allowed to turn and the lockout switch 7 remains covered with the cover member 71. With the lockout switch 7 covered with the cover member 71, the maintenance operator are not allowed to operate the lockout switch 7. When the padlock 72 is unlocked and then the cover member 71 is turned upward, the lockout switch 7 appears. This allows the maintenance operator to operate the lockout switch 7.

As described above, in the present embodiment, the lockout switch 7, the plurality of maintenance operation devices 96 required for maintenance work, and the connectors 97 are concentratedly disposed in the box 9.

[Display Device]

Figure 7:
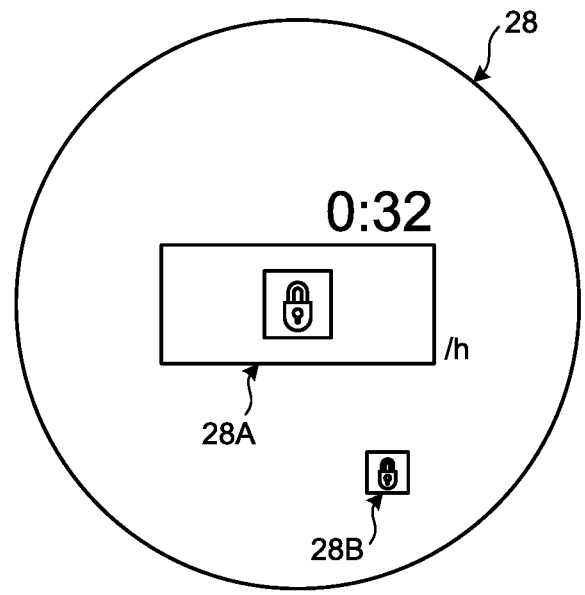
FIG. 7(A) and FIG. 7(B) are views illustrating a display example of a display device that is provided in an operation cab according to the first embodiment.
Figure 7:
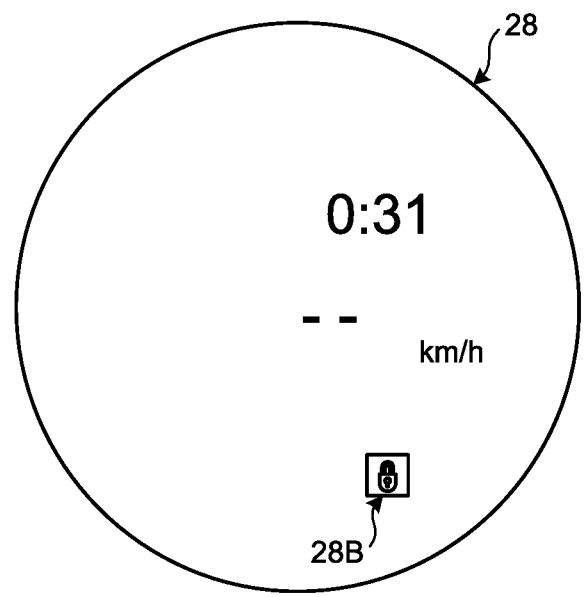

FIG. 7 is a view illustrating a display example of the display device 28 that is provided in the operation cab 27 according to the present embodiment. The display device 28 includes, for example, a speed meter display portion that indicates the travel speed of the dump truck 1.

As illustrated in FIG. 7 (A), when the lockout switch 7 is operated, the above described LED indicator 8 lights up and a display data 28A and a display data 28B indicating that the lockout state is made are displayed on the display device 28 provided in the operation cab 27. The display data 28A is displayed on the central portion of a display area of the display device 28. The display data 28B is displayed on the lower portion of the display area of the display device 28. As the lockout switch 7 is operated, and a predetermined time (for example, two seconds) has elapsed from the start of displaying a display data 27A, the display of the display data 28A ends as illustrated in FIG. 7(B). As illustrated in FIG. 7(B), in the lockout state, the display of the display data 28B continues.

This allows the driver boarding the operation cab 27 to also recognize whether the lockout state is made.

[Operation]

Figure 8:
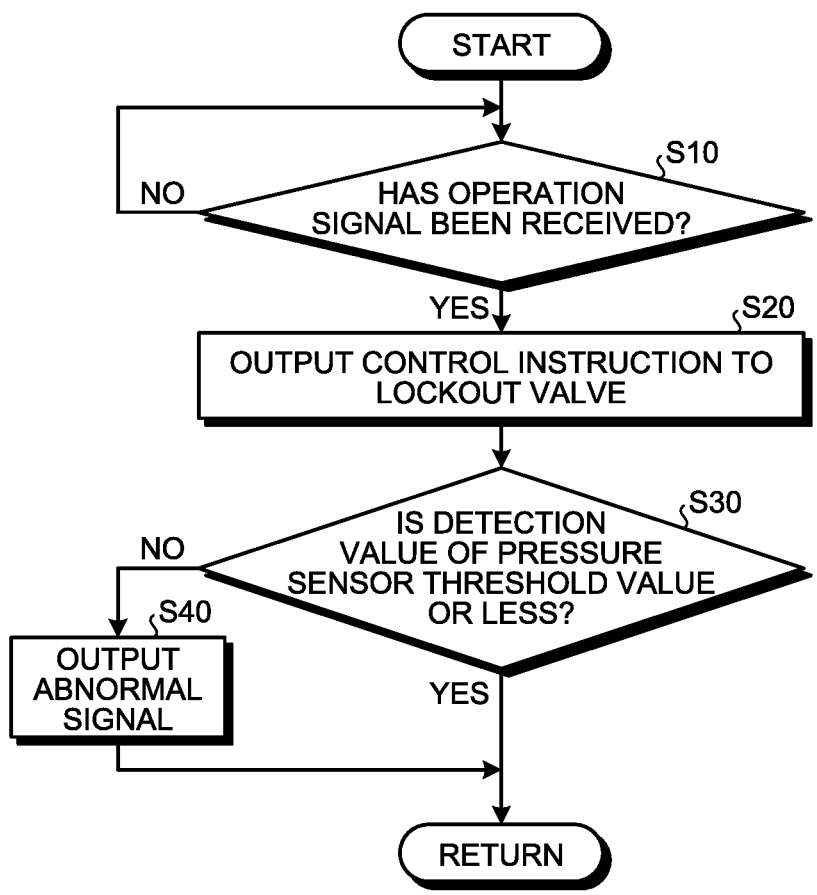
FIG. 8 is a flow chart illustrating one example of an operation of the controller according to the first embodiment.

FIG. 8 is a flow chart illustrating one example of an operation of the controller 5 according to the present embodiment. When intending to perform maintenance work in the lockout state, the maintenance operator opens the lid member 92 of the box 9, unlocks the padlock 72, and then opens the cover member 71 to operate the lockout switch 7. The operation signal generated by operating the lockout switch 7 is output to the controller 5.

The controller 5 determines whether the operation signal has been received (step S10). In step S10, when it is determined that no operation signal has been received (step S10: No), processing of step S10 is performed until the controller 5 determines that the operation signal has been received.

In step S10, when it is determined that the operation signal has been received (step S10: Yes), the controller 5 outputs the control instruction for bringing into lockout state, to the lockout valve 123 (step S20).

As a result, with the engine 6 driving, the hydraulic oil discharged from the hydraulic pump 11 is supplied to the hydraulic oil tank 15 without being supplied to the steering cylinder 44 and the work-machine cylinder 31. The maintenance operator can operate the maintenance work without stopping the engine 6, with the drive of the steering cylinder 44 and the work-machine cylinder 31 restricted. The maintenance operator can perform, for example oiling work, as maintenance work.

The controller 5 monitors the detection signal of the pressure sensor 17. The controller 5 determines whether the detection value of the pressure sensor 17 is the pressure threshold value or less (step S30).

In step S30, when it is determined the detection value of the pressure sensor 17 is not the pressure threshold value or less (step S30: No), the controller 5 determines that the lockout valve 123 is abnormal. The controller 5 outputs the abnormal signal to the display device 28. The display device 28 displays a display data indicating that the lockout valve 123 is abnormal.

In step S30, when it is determined the detection value of the pressure sensor 17 is the pressure threshold value or less (step S30: Yes), the lockout valve 123 is determined as normal.

After completion of the maintenance work, the maintenance operator operates the lockout switch 7 so as to allow the lockout state to be released. As a result, the lockout state is released, and the steering cylinder 44 and the work-machine cylinder 31 are in a drivable state.

[Effects]

As described above, according to the present embodiment, the lockout valve 123 is provided that is switchable from one to the other between the non-lockout state in which the hydraulic oil supplied from the hydraulic pump 11 is supplied to the channel 16E and the lockout state in which the hydraulic oil supplied from the hydraulic pump 11 is supplied to the channel 16F. The maintenance operator can restrict the drive of the steering cylinder 44 and the work-machine cylinder 31 by operating the lockout switch 7. According to the present embodiment, the reliability of the lockout system can be secured, for example, in comparison with a system of generating the lockout state by driving the swash plate of the hydraulic pump 11 with a driving element. That is, only by switching the supply destination of the hydraulic oil to either one of the channel 16E and the channel 16F, easy switching between the lockout state and the non-lockout state can be made. In other words, in the lockout state, the drive of the hydraulic actuator driven by supplying the hydraulic oil can be reliably restricted. Therefore, risks of failure for the lockout system are reduced and the reliability is improved.

In the present embodiment, the pressure sensor 17 is provided. This enables to recognize whether the lockout valve 123 functions normally, in accordance with the detection value of the pressure sensor 17. When the lockout valve 123 is abnormal, the abnormal signal is output, so that the operator or the maintenance operator can recognize that the lockout valve 123 is abnormal. In other words, in the lockout state, self-determination whether the drive of the hydraulic actuator that drives by supplying the hydraulic oil is reliably restricted can be made; furthermore, the reliability of the lockout system can be improved.

In the present embodiment, the LED indicator 8 is provided. In the lockout state, the LED indicator 8 lights up, so that the operator or the maintenance operator can recognize that the lockout state is made.

The LED indicator 8 is provided next to the lockout switch 7. This allows the maintenance operator who has operated the lockout switch 7 to recognize whether the lockout switch 7 has been normally operated, by looking at the LED indicator 8.

The box 9 in which the lockout switch 7 is provided is disposed in the vicinity of the ascent/descent passage leading to the operation cab 27. This allows the operator or the maintenance operator to move to the operation cab 27 and then to perform a predetermined maintenance work immediately after operating the lockout switch 7.

The lockout switch 7 is covered with the cover member 71. The cover member 71 is locked with the padlock 72. This inhibits a third person other than the operator or the maintenance operator from operating the lockout switch 7.

Not only the lockout switch 7 and the LED indicator 8 but also the plurality of maintenance operation devices 96 is provided on the support plate 95 of the box 9. This configuration improves workability of maintenance work.

Second Embodiment

A second embodiment will be described. In the descriptions below, constituent elements that are the same as those in the above embodiment are denoted with the same reference signs, and the descriptions thereof will be simplified or omitted.

In the above embodiment, the work vehicle is defined as the dump truck. In the present embodiment, the work vehicle is defined as a wheel loader.

Figure 9:
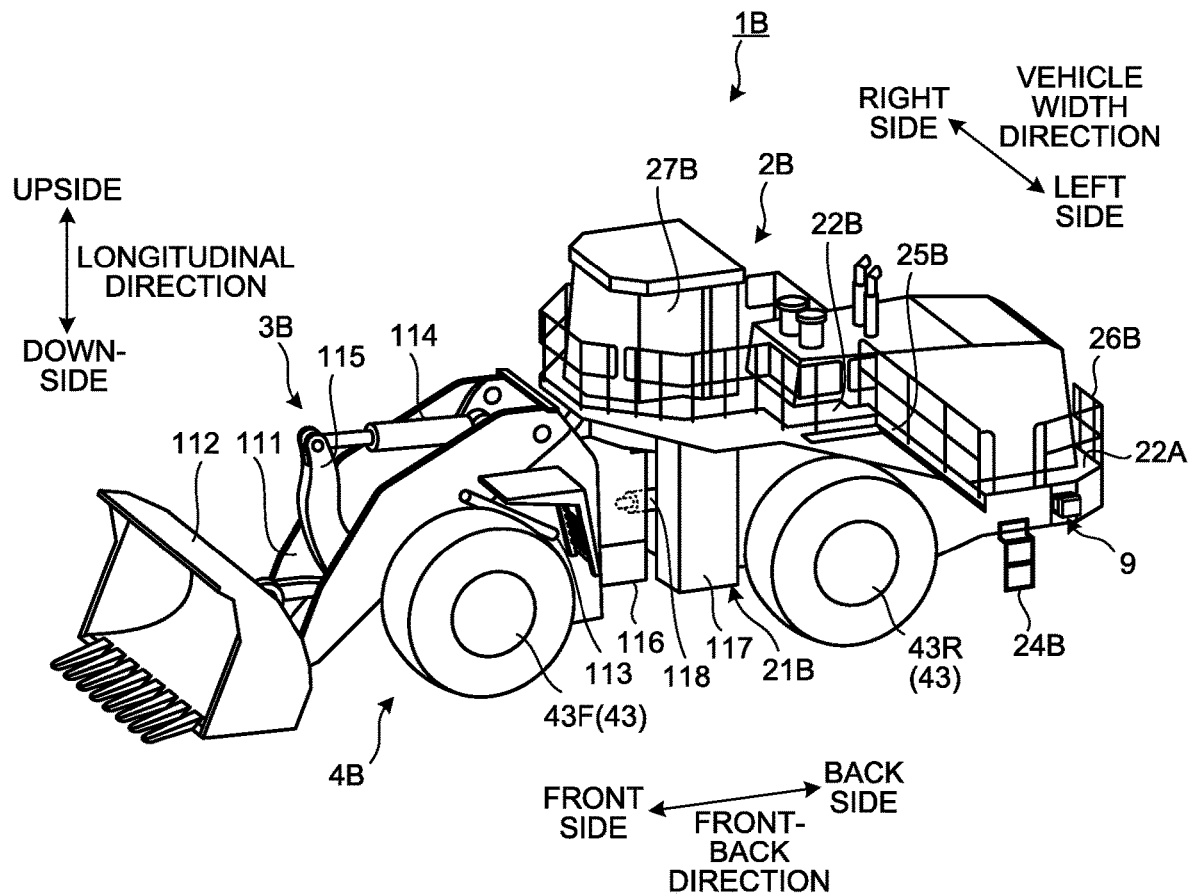
FIG. 9 is a perspective view illustrating one example of a work vehicle according to a second embodiment.

FIG. 9 is a perspective view illustrating one example of a work vehicle 1B according to the present embodiment. In the descriptions below, the work vehicle 1B is accordingly referred to as a wheel loader 1B.

The wheel loader 1B includes a vehicle main body 2B, a work machine 3B supported by the vehicle main body 2B, and a travel device 4B that supports the vehicle main body 2B. The vehicle main body 2B includes a frame 21B and an operation cab 27B. The wheel loader 1B is operated by an operator boarding the operation cab 27B. A work operation device 73 that is to be operated by the operator is disposed in the operation cab 27B. The work operation device 73, for example, includes a steering lever, a transmission shift lever, an accelerator pedal, a brake pedal, and a work-machine lever for operating the work machine 3B. The operator operates the work operation device 73 to adjust a travel direction, adjust a travel speed, and switch forward movement or backward movement of the work vehicle 1B, and perform an operation of the work machine 3B.

The frame 21B includes a lower deck 22A and an upper deck 22B. The lower deck 22A is installed to the side of a rear portion of the frame 21B. The upper deck 22B is disposed on the front side and the upside of the lower deck 22A. On the downside of the lower deck 22A, for example, a step 24B is disposed. A diagonal ladder 25B is disposed between the lower deck 22A and the upper deck 22B. A palisade handrail 26B is disposed on the sides of the lower deck 22A, the upper deck 22B, and the diagonal ladder 25B.

The travel device 4B includes the rotatable wheel 43. A tire is mounted on the wheel 43. The wheel 43 includes two front wheels 43F and two rear wheels 43R.

The work machine 3B includes: a boom 111 movably coupled to the vehicle main body 2; a bucket 112 that is an excavating member movably coupled to the boom 111; and a bell crank 115 coupled to the bucket 112 via a link. The work machine 3B includes a boom cylinder 113 that drives the boom 111 and a bucket cylinder 114 that drives the bucket 112. The boom cylinder 113 has one end coupled to the vehicle main body 2 and the other end coupled to the boom 111. When the operator operates the work-machine lever, the boom cylinder 113 expands and contracts. This allows the boom 111 to move in the longitudinal direction. The bucket cylinder 114 has: one end coupled to the vehicle main body 2; and the other end coupled to the bell crank 115.

When the operator operates the work-machine lever, the bucket cylinder 114 expands and contracts. This allows the bucket 112 to move in the longitudinal direction.

The frame 21B includes a front frame 116 and a rear frame 117. The front frame 116 and the rear frame 117 are bendably coupled to each other in the lateral direction.

The wheel loader 1B includes a steering cylinder 118. The steering cylinder 118 is a hydraulic cylinder that is driven by the hydraulic oil supplied from the hydraulic pump 11. One end of the steering cylinder 118 is coupled to the front frame 116. The other end of the steering cylinder 118 is coupled to the rear frame 117. The steering cylinder 118 expands and contracts, so that the travel direction of the wheel loader 1B is laterally changed.

The box 9 is disposed on a lower left portion of the lower deck 22A. The box 9 is disposed near the ascent/descent passage that allows the operator or an inspector to lead to the operation cab 27.

Figure 10:
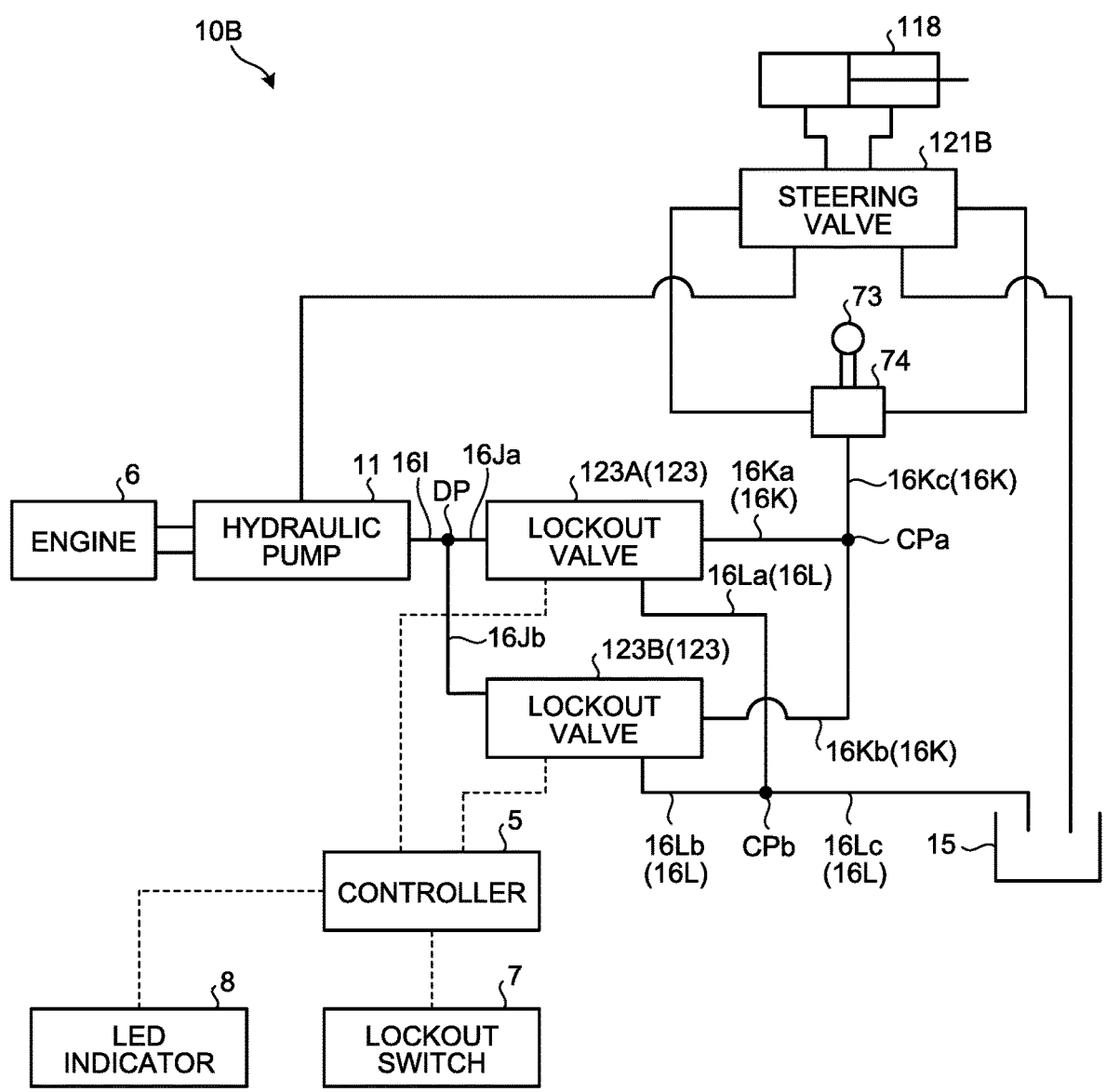
FIG. 10 is a view illustrating one example of a hydraulic system according to the second embodiment.

FIG. 10 is a view illustrating one example of a hydraulic system 10B according to the present embodiment. As illustrated in FIG. 10, the hydraulic system 10B includes: the hydraulic pump 11 that is driven by the engine 6; the lockout valve 123 (123A and 123B) that switches between the lockout state and the non-lockout state; a steering valve 121B that is a flow-rate adjusting valve capable of adjusting the flow rate and the direction of the hydraulic oil that is to be supplied to the steering cylinder 118; and the work operation device 73 for operating the steering valve 121B. The work operation device 73 includes: an operation lever; and a rotary valve 74 interlocked with operation of the operation lever.

The hydraulic oil is supplied from the hydraulic pump 11 to the rotary valve 74 of the work operation device 73. The lockout valve 123 is provided in a channel between the hydraulic pump 11 and the rotary valve 74. The hydraulic oil supplied from the hydraulic pump 11 to the steering valve 121B via the rotary valve 74 functions as pilot oil for operating the steering valve 121B. The hydraulic oil supplied from the hydraulic pump 11 to the rotary valve 74 is supplied to the steering valve 121B as the pilot oil. The pilot oil moves a spool of the steering valve 121B.

The work operation devices 73 is operated in order to supply the hydraulic oil supplied from the hydraulic pump 11 to the rotary valve 74, to the steering valve 121B, as the pilot oil. The operation lever of the work operation device 73 is operated, so that the rotary valve 74 drives. The rotary valve 74 is capable of adjusting the flow rate and the direction of the pilot oil that is to be supplied to the spool of the steering valve 121B. The spool of the steering valve 121B moves, in accordance with the pressure of the pilot oil supplied to the steering valve 121B.

The lockout valve 123 switches from one to the other between the non-lockout state (first state) in which the hydraulic oil supplied from the hydraulic pump 11 is supplied to a channel 16K (first channel) and the lockout state (second state) in which the hydraulic oil supplied from the hydraulic pump 11 is supplied to a channel 16L (second channel).

The channel 16K makes a connection between the lockout valve 123 and the rotary valve 74 of the work operation device 73. The channel 16L makes a connection between the lockout valve 123 and the hydraulic oil tank 15. The non-lockout state is a state in which the pilot oil is supplied to the steering valve 121B via the work operation device 73. The lockout state is a state in which the pilot oil is supplied to the hydraulic oil tank 15, not to the work operation device 73. When no pilot oil is supplied to the work operation device 73, the drive of a steering cylinder 18 is restricted.

In the present embodiment, the lockout valve 123 redundantly includes the first lockout valve 123A (first switching valve) and the second lockout valve 123B (second switching valve). Each of the lockout valve 123A and the lockout valve 123B is coupled to the work operation device 73 via the first channel 16K. Each of the lockout valve 123A and the lockout valve 123B is coupled to the hydraulic oil tank 15 via the second channel 16L.

In the present embodiment, the channel 16K includes a channel 16Ka and a channel 16Kb disposed parallel to each other, and a channel 16Kc that makes a connection between the channel 16Ka, the channel 16Kb, and the rotary valve 74. The channel 16Ka and the channel 16Kb join each other at a confluence CPa. The channel 16Kc is connected to each of the channel 16Ka and the channel 16Kb at the confluence CPa.

In the present embodiment, the channel 16L includes a channel 16La and a channel 16Lb disposed parallel to each other, and a channel 16Lc that makes a connect between the channel 16La, the channel 16Lb, and the hydraulic oil tank 15. The channel 16La and the channel 16Lb join at a confluence CPb. The channel 16Lc is connected to each of the channel 16La and the channel 16Lb at the confluence CPb.

The lockout valve 123A is coupled to the rotary valve 74 via the channel 16Ka and the channel 16Kc. The lockout valve 123A is coupled to the hydraulic oil tank 15 via the channel 16La and the channel 16Lc.

The lockout valve 123B is coupled to the rotary valve 74 via the channel 16Kb and the channel 16Kc. The lockout valve 123B is coupled to the hydraulic oil tank 15 via the channel 16Lb and the channel 16Lc.

The hydraulic pump 11 discharges the hydraulic oil into a channel 16I. The channel 16I divides into a channel 16Ja and a channel 16Jb at a confluence DP. The lockout valve 123A is coupled to the hydraulic pump 11 via the channel 16Ja and the channel 16I. The lockout valve 123B is coupled to the hydraulic pump 11 via the channel 16Jb and the channel 16I.

As described above, switching between the non-lockout state and the lockout state may be made by switching between supply and shutoff of the pilot oil for the steering valve 121B.

In the present embodiment, the plurality of lockout valves 123 is additionally disposed parallel to each other. With this configuration, even when an abnormality occurs in the lockout valve 123A on one side, the lockout valve 123B on the other side can switch between the non-lockout state and the lockout state.

Another Embodiment

In the above embodiment, the work vehicle is defined as the dump truck or the wheel loader. The lockout system described in the above embodiment may be applied to at least one of a bulldozer, a mining motor grader, and an excavator. As described above, the lockout system of the dump truck, with the engine driven, restricts the drive of the hydraulic actuators that are capable of driving the steering device and the dump body. The lockout system of the wheel loader, with the engine driven, restricts the drive of the hydraulic actuators that are capable of driving the work machine and the steering device. The lockout system of the excavator, with the engine driven, restricts the drive of hydraulic actuators that are capable of driving the work machine, a swing body, and a travel body. In each of the work vehicle, with the engine driven, a device that is to be restricted by a machine lockout system is a hydraulic actuator that is driven by hydraulic pressure; however, the hydraulic actuators indicated in the above embodiments are exemplified and not limited to these actuators.

REFERENCE SIGNS LIST

1 Dump truck (work vehicle)
1B Wheel loader (work vehicle)
2 Vehicle main body
3 Dump body
3B Work machine
4 Travel device
5 Controller
6 Engine
7 Lockout switch (restriction operation device)
8 LED indicator (notification device)
9 Box
10 Hydraulic system
0B Hydraulic system
1 Hydraulic pump
2 Valve device
35 hydraulic oil tank
6A Channel
16B Channel
16C Channel
16D Channel
16E Channel (first channel)
16F Channel (second channel)
16G Channel
16H Channel
16K Channel (first channel)
16L Channel (second channel)
16M Parallel channel
17 Pressure sensor
21 Frame
21B Frame
22 Floor deck
23 Lower deck
24 Tiltable step
24B Step
25 Diagonal ladder
26 Handrail
27 Operation cab
28 Display device
28A Display data
28B Display data
31 Work-machine cylinder
31B Bottom chamber
31H Head chamber
42 Steering device
43 Wheel
43F Front wheel
43R Rear wheel
44 Steering cylinder
44L Steering cylinder
44R Steering cylinder
44B Bottom chamber
44H Head chamber
51 Operation signal acquisition unit
52 Instruction generating unit
53 Instruction output unit
54 Notification output unit
55 Detection signal acquisition unit
56 Determination unit 57 Abnormal signal output unit
71 Cover member
72 Padlock
73 Work operation device
74 Rotary valve
91 Main body member
92 Lid member
93 Lock mechanism
94 Handle member
95 Support plate
96 Maintenance operation device
96A Starter disconnector switch
96B Battery disconnector switch
96C Engine-room lamp illuminating switch
97 Connector
97A Jump-start connector
97B Data connector
98 System operation lamp
99 Cover coupling portion
111 Boom
112 Bucket
113 Boom cylinder
114 Bucket cylinder
115 Bell crank
116 Front frame
117 Rear frame
118 Steering cylinder
121 Steering valve
121B Steering valve
122 Work-machine valve
123 Lockout valve
123A Lockout valve
123B Lockout valve
124 Priority valve
311 Cylinder tube
312 Piston
313 Rod
441 Cylinder tube
442 Piston
443 Rod

The invention claimed is:

1. A work vehicle, comprising:
a hydraulic pump that is driven by an engine;
a hydraulic actuator that is driven by hydraulic oil supplied from the hydraulic pump;
a switching valve configured to switch from a first state, in which the hydraulic oil supplied from the hydraulic pump is supplied to a first channel, and a second state, in which the hydraulic oil supplied from the hydraulic pump is supplied to a second channel;
a restriction operation device configured to generate an operation signal that restricts a drive of the hydraulic actuator;
a controller configured to control the switching valve;
a flow-rate adjusting valve configured to adjust a flow rate and a direction of the hydraulic oil that is to be supplied to the hydraulic cylinder; and
a work operation device that is operated to supply the hydraulic oil supplied from the hydraulic pump, to the flow-rate adjusting valve, as pilot oil,
wherein the controller includes: an operation signal acquisition unit configured to acquire the operation signal; and an instruction output unit configured to output, to the switching valve, a control instruction that restricts the drive of the hydraulic actuator with the engine driving, in response to the operation signal,
wherein the hydraulic actuator includes a hydraulic cylinder, and
wherein
the first channel connects the switching valve to the work operation device,
the second channel connects the switching valve to a hydraulic oil tank,
the first state is a state in which the pilot oil is supplied to the flow-rate adjusting valve via the work operation device, and
the second state is a state in which the pilot oil is supplied to the hydraulic oil tank without being supplied to the work operation device.

2. The work vehicle according to claim 1, wherein
the first channel connects the switching valve to the hydraulic actuator,
the second channel connects the switching valve to a hydraulic oil tank,
the first state is a state in which the hydraulic oil is supplied to the hydraulic actuator, and
the second state is a state in which the hydraulic oil is supplied to the hydraulic oil tank without being supplied to the hydraulic actuator.

3. A work vehicle according to claim 1, wherein
the switching valve includes a first switching valve and a second switching valve,
each of the first switching valve and the second switching valve is coupled to the work operation device via the first channel, and
each of the first switching valve and the second switching valve is coupled to the work hydraulic oil tank via the second channel.

4. A work vehicle, comprising:
a hydraulic pump that is driven by an engine;
a hydraulic actuator that is driven by hydraulic oil supplied from the hydraulic pump;
a switching valve configured to switch from a first state, in which the hydraulic oil supplied from the hydraulic pump is supplied to a first channel, and a second state, in which the hydraulic oil supplied from the hydraulic pump is supplied to a second channel;
a restriction operation device configured to generate an operation signal that restricts a drive of the hydraulic actuator; and
a controller configured to control the switching valve,
wherein the controller includes: an operation signal acquisition unit configured to acquire the operation signal; and an instruction output unit configured to output, to the switching valve, a control instruction that restricts the drive of the hydraulic actuator with the engine driving, in response to the operation signal, and
wherein the controller includes: a detection signal acquisition unit configured to acquire a detection signal of at least one of pressure in the first channel and pressure in the second channel; a determination unit configured to determine whether the switching valve is abnormal in response to the detection signal and the control instruction; and an abnormal signal output unit configured to output an abnormal signal when the determination unit determines that the switching valve is abnormal.

5. A work vehicle, comprising:
a hydraulic pump that is driven by an engine;
a hydraulic actuator that is driven by hydraulic oil supplied from the hydraulic pump;
a switching valve configured to switch from a first state, in which the hydraulic oil supplied from the hydraulic pump is supplied to a first channel, and a second state, in which the hydraulic oil supplied from the hydraulic pump is supplied to a second channel;
a restriction operation device configured to generate an operation signal that restricts a drive of the hydraulic actuator; and
a controller configured to control the switching valve,
wherein the controller includes: an operation signal acquisition unit configured to acquire the operation signal; and an instruction output unit configured to output, to the switching valve, a control instruction that restricts the drive of the hydraulic actuator with the engine driving, in response to the operation signal, and
wherein the controller further includes: a notification output unit configured to output a notification signal indicating a state in which the drive of the hydraulic actuator is restricted, in response to the control instruction.

6. The work vehicle according to claim 5, further comprising:
a notification device provided next to the restriction operation device,
wherein the notification output unit is configured to output the notification signal to the notification device.

7. The work vehicle according to claim 1, further comprising:
an operation cab; and
an ascent/descent passage leading to the operation cab,
wherein the restriction operation device is disposed on the ascent/descent passage or at a position of a predetermined distance from the ascent/descent passage.

8. The work vehicle according to claim 1, further comprising:
a support plate on which the restriction operation device is disposed; and
a cover member rotatably supported by the support plate and configured to cover the restriction operation device.

9. The work vehicle according to claim 8, further comprising:
a maintenance operation device for maintenance work,
wherein the maintenance operation device is provided on the support plate.

10. The work vehicle according to claim 4, further comprising:
a support plate on which the restriction operation device is disposed; and
a cover member rotatably supported by the support plate and configured to cover the restriction operation device.

11. The work vehicle according to claim 5, further comprising:
a support plate on which the restriction operation device is disposed; and
a cover member rotatably supported by the support plate and configured to cover the restriction operation device.

* * * * *